(12) United States Patent
Col et al.

(10) Patent No.: US 6,581,150 B1
(45) Date of Patent: Jun. 17, 2003

(54) APPARATUS AND METHOD FOR IMPROVED NON-PAGE FAULT LOADS AND STORES

(75) Inventors: Gerard M. Col, Austin, TX (US); Darius D. Gaskins, Austin, TX (US); Terry Parks, Austin, TX (US)

(73) Assignee: IP-First, LLC, Freemont, CA (US)

( * ) Notice: Subject to any disclaimer, the term of this patent is extended or adjusted under 35 U.S.C. 154(b) by 409 days.

(21) Appl. No.: 09/640,117

(22) Filed: Aug. 16, 2000

(51) Int. Cl.[7] .............................................. G06F 12/00
(52) U.S. Cl. ........................ 711/201; 711/169; 712/204
(58) Field of Search ................................. 711/201, 169, 711/200, 202; 712/204, 225, 222, 226, 238

(56) References Cited

U.S. PATENT DOCUMENTS

| | | | | |
|---|---|---|---|---|
| 4,860,197 A | * | 8/1989 | Langendorf et al. ........ 712/238 |
| 5,577,200 A | * | 11/1996 | Abramson et al. ............. 714/50 |
| 5,666,508 A | * | 9/1997 | Marshall, Jr. ................ 711/201 |
| 5,668,984 A | * | 9/1997 | Taborn et al. ............... 712/222 |
| 6,009,510 A | * | 12/1999 | Henry et al. ................ 712/204 |
| 6,209,082 B1 | * | 3/2001 | Col et al. .................... 712/225 |
| 6,349,383 B1 | * | 2/2002 | Col et al. .................... 712/226 |

* cited by examiner

Primary Examiner—Matthew Kim
Assistant Examiner—Zhuo H. Li
(74) Attorney, Agent, or Firm—James W. Huffman

(57) ABSTRACT

An apparatus and method are provided for improving the speed at which a pipeline microprocessor accesses misaligned memory operands. The apparatus includes page boundary evaluation logic and address logic. The page boundary evaluation logic evaluates an address corresponding to the misaligned memory operand, and determines whether or not access to the misaligned memory operand is within a single memory page. The address logic is coupled to the page boundary evaluation logic. When access to the misaligned memory operand is within the single memory page, the address logic eliminates an access tickle instruction from an instruction sequence generated to access the misaligned memory operand.

30 Claims, 7 Drawing Sheets

FIG. 3 (Related Art)

*Execution of Aligned Load and Misalignd Load (EBX = 00000034h)* ⸺ 300

| Cycle | Translate | Register | Address | Data/ALU | |
|---|---|---|---|---|---|
| 1 | MOV EAX,[EBX] | *** | *** | *** | |
| 2 | *** | LD EAX,[EBX] | *** | *** | |
| 3 | *** | *** | LD EAX,[EBX] | *** | |
| 4 | *** | *** | *** | LD EAX,00000030h | 1 CYCLE |
| 5 | *** | *** | *** | *** | |
| 6 | *** | *** | *** | *** | |
| 11 | MOV EAX,[EBX+1] | *** | *** | *** | |
| 12 | *** | LD EAX,[EBX+1] | *** | *** | |
| 13 | *** | *** | LD EAX,[EBX+1] | *** | |
| 14 | --- | --- | --- | TICK 00000030h | |
| 15 | --- | --- | --- | LD EAX,00000038h | 3 CYCLES |
| 16 | *** | *** | *** | LD EAX,00000030h | |

Pipeline Stages for Improved Non-Page Fault Accesses

FIG. 6

*Aligned Load and Misaligned Load (EBX = 00000034h) With Page Limit Check*

| Cycle | Translate | Register | Address | Data/ALU |
|---|---|---|---|---|
| 1 | MOV EAX,[EBX] | *** | *** | *** |
| 2 | *** | LD EAX,[EBX] | *** | *** |
| 3 | *** | *** | LD EAX,[EBX] | *** |
| 4 | *** | *** | *** | LD EAX,00000030h |
| 5 | *** | *** | *** | *** |
| 6 | *** | *** | *** | *** |
| 11 | MOV EAX,[EBX+1] | *** | *** | *** |
| 12 | *** | LD EAX,[EBX+1] | *** | *** |
| 13 | *** | *** | LD EAX,[EBX+1] | *** |
| 14 | --- | --- | --- | LD EAX,00000030h |
| 15 | *** | *** | *** | LD EAX,00000038h |

1 CYCLE (cycles 4)

2 CYCLES (cycles 14–15)

600

APPARATUS AND METHOD FOR IMPROVED NON-PAGE FAULT LOADS AND STORES

BACKGROUND OF THE INVENTION

1. Field of the Invention

This invention relates in general to the field of data processing in computers, and more particularly to an apparatus and method for reducing the number of micro instructions and commensurate clock cycles that are required to access misaligned memory operands.

2. Description of the Related Art

A present day microprocessor has an instruction path, or pipeline, that is divided into stages, with each stage dedicated to performing a specific type of function. A first stage fetches program instructions from instruction memory and places them in a macro instruction queue. A following stage decodes these macro instructions into associated micro instructions. Each of the associated micro instructions directs the microprocessor to perform certain tasks in one or more of the subsequent stages. Together, the tasks specified by each of the associated micro instructions accomplish an overall operation that is directed by a corresponding macro instruction. Decoded micro instructions are executed in sequence by and proceed through successive stages of the microprocessor in synchronization with a microprocessor clock signal.

In addition to prescribing an operation to be performed, many macro instructions also specify operands to be used in the carrying out the prescribed operation. For example, a division macro instruction will specify both a dividend operand and a divisor operand. Most instruction sets today give a programmer a wide variety of options for prescribing operands, one such option being the option to specify an operand that is located at an address in memory.

To access a memory operand, a microprocessor must first generate an address corresponding to the operand's location in memory. Then this address is issued to memory over an address bus as part of a task to either load or store the operand. Memory devices, in turn, access the operand at the prescribed address. For load operations, the operand is provided from the memory devices to the microprocessor over a data bus. For store operations, the operand is written from the microprocessor to the memory devices over the data bus.

Early microprocessor designs provided a rudimentary 8-bit data bus. Hence, to access an operand whose size was greater than one byte required that the microprocessor execute multiple access micro instructions. And because bus accesses are significantly slower than transfers within a microprocessor, this approach was deemed early on to be deficient because it took too long to retrieve/store memory operands.

Many improvements have been made since that time to speed up the access of memory operands. One such development, multiple-byte data buses, now allows multiple-byte memory operands to be accessed within a single load/store cycle. A significant number of today' microprocessors have a 64-bit data bus, thus allowing access of eight bytes (i.e., a quadword) in parallel. Furthermore, all accesses are made according to the full width of the data bus. Hence, for a 64-bit data bus, all accesses over the bus are made to 8-byte address ranges, regardless of the size of the prescribed memory operand. In fact, for a 64-bit data bus architecture, the lower three bits of an address are not even provided on the address bus because the lower three bits are used to address individual bytes within a given 8-byte address range.

When a multiple-byte operand is fully contained within the address range corresponding to the size of the data bus, then only one load/store cycle is required to access the operand. But when only part of the operand is contained within the address range and another part of the operand is contained within a previous/next address range, then more than one cycle is required to accomplish the access. An operand that only partially resides within the address range is referred to as a misaligned operand.

To access a misaligned memory operand spanning two sequential address ranges requires three instructions: a first access instruction to access a first part of the misaligned operand within a first of the two sequential address ranges; a second access instruction to access a second part of the misaligned operand within the second of the two sequential address ranges; and an additional instruction to ensure that both parts of the misaligned operand can be retrieved without incurring an error.

This additional instruction is called an access tickle instruction, or more briefly, a tickle instruction. The tickle instruction must be executed when accessing a misaligned operand because memory paging schemes may allow access to the first part of the misaligned operand while precluding access to the second part of the misaligned operand, thus permitting a partial, and inaccurate, load or store of the misaligned operand. Memory paging schemes divide the memory address space up into discrete blocks and allow a programmer to assign access privileges to each block, or page. The most common page size seen today is a 4 kB page. In addition, paging schemes allow a programmer to provide a map, in memory, for each block of memory addresses generated by the microprocessor to a corresponding physical address within the computer system. This mapping feature allows an application program to simulate a large address space by using a small amount of memory and some disk space.

Paging is a powerful feature within present day computer systems. Yet, when paging is employed, each time an instruction directs access to a particular generated address, or virtual address, two actions must occur. First, the virtual address must be mapped to a corresponding physical address within a specific memory page. Second, access privileges to the memory page must be validated. If access is denied to the memory page, then the directed access operation is aborted.

As part of a misaligned access instruction sequence, a present day microprocessor first executes the tickle instruction to verify access to a memory page containing the second part of the misaligned operand, but it does not access the second part. Hence, the memory page containing the second part is "tickled." If access is denied to the memory page containing the second part, then the access operation can be aborted prior to fetching the first part of the operand. If access is allowed, then it is known that access to the memory page containing the second part will be allowed prior to execution of an instruction directing access to the first part.

Tickle instructions are required to perform misaligned memory accesses because a present day microprocessor does not provide the capability to determine, prior to address translation and access validation, whether or not the two parts of a misaligned operand will reside in two separate memory pages having different access privileges.

The present inventors, however, have observed that less than one percent of all misaligned operands actually reside in two different memory pages and hence, a significant number of pipeline cycles are being wasted in the execution of non-essential tickle instructions.

Therefore, what is needed is an apparatus in a pipeline microprocessor for accessing a misaligned memory operand that eliminates generation of a tickle instruction when both parts of the operand lie within the same memory page.

In addition, what is needed is a misaligned memory operand access apparatus that determines, prior to generation of a tickle instruction, whether or not a misaligned memory operand spans more than a single memory page.

Furthermore, what is needed is a method in a pipeline microprocessor for accessing misaligned memory operands that precludes generation of a tickle instruction when the misaligned operands do not cross a memory page boundary.

SUMMARY

Accordingly, it is a feature of the present invention to provide an apparatus in a microprocessor for accessing a misaligned memory operand. The apparatus includes page boundary evaluation logic and address logic. The page boundary evaluation logic evaluates an address corresponding to the misaligned memory operand, and determines whether or not access to the misaligned memory operand is within a single memory page. The address logic is coupled to the page boundary evaluation logic. The address logic eliminates an access tickle instruction when access to the misaligned memory operand is within the single memory page.

In another aspect, it is a feature of the present invention to provide a microprocessor apparatus for accessing a misaligned memory operand. The microprocessor apparatus has address logic and page limit logic. The address logic generates access instructions to access the misaligned memory operand. The access instructions include an access tickle instruction, a first access instruction, and a second access instruction. The access tickle instruction only directs page access validation of a second part of the misaligned memory operand. The first access instruction directs page access validation of and access to a first part of the misaligned memory operand. The second access instruction directs page access validation of and access to the second part of the misaligned memory operand. The page limit logic is coupled to the address logic. The page limit logic determines, prior to generation of the access tickle instruction, whether or not the misaligned memory operand spans two memory pages. If the misaligned memory operand resides within a single memory page, the page limit logic directs the address logic to preclude generation of the access tickle instruction.

In yet another aspect, it is a feature of the present invention to provide a data entity load/store apparatus in a microprocessor. The data entity load/store apparatus includes address stage logic and data/ALU stage logic. The address stage logic provides instructions to load/store data entities to/from a memory. The address stage logic has load/store instruction generation logic and a page boundary evaluator. The load/store instruction generation logic generates a specific instruction sequence to load/store a misaligned data entity. The page boundary evaluator is coupled to the load/store instruction generation logic. The page boundary evaluator indicates conditions such that a tickle instruction is eliminated from within the specific instruction sequence. The data/ALU stage logic is coupled to the address stage logic. The data/ALU stage logic executes the specific instruction sequence to load/store said misaligned data entity. If the tickle instruction is provided, then the data/ALU stage logic executes the tickle instruction by validating access to a first memory page without loading/storing a first portion of the misaligned data entity from/to the first memory page.

In a further aspect, it is a feature of the present invention to provide a method in a microprocessor for accessing a misaligned memory operand. The method includes evaluating an address corresponding to the misaligned memory operand to determine whether or not the misaligned memory operand is within a single memory page; and, if the misaligned memory operand is within the single memory page, providing an instruction sequence to load a first part and a second part of the misaligned memory operand from the single memory page, where the instruction sequence does not perform a stand-alone tickle operation.

BRIEF DESCRIPTION OF THE DRAWINGS

These and other objects, features, and advantages of the present invention will become better understood with regard to the following description, and accompanying drawings where:

FIG. 3 is a timing diagram illustrating how the microprocessor of FIGS. 1 and 2 accesses both aligned and misaligned memory operands.

FIG. 6 is a timing diagram illustrating how the microprocessor of FIGS. 4 and 5 accesses both aligned and misaligned memory operands.

DETAILED DESCRIPTION

In view of the above background on how a present day pipeline microprocessor accesses memory operands, several related art examples will now be discussed with reference to FIGS. 1 through 3. These examples illustrate how such present day techniques for performing misaligned accesses unnecessarily delay the execution of an application program. Following this discussion, a detailed description of the present invention will be provided with reference to FIGS. 4 through 7. In the event that a misaligned operand does not cross a memory page boundary-a condition that holds true for virtually all accesses to operands in memory-use of the present invention eliminates the "tickle" instruction that microprocessors presently execute to determine page faults. Elimination of the tickle instruction significantly decreases the number of pipeline cycles that are required to access misaligned data entities.

Figure 1:
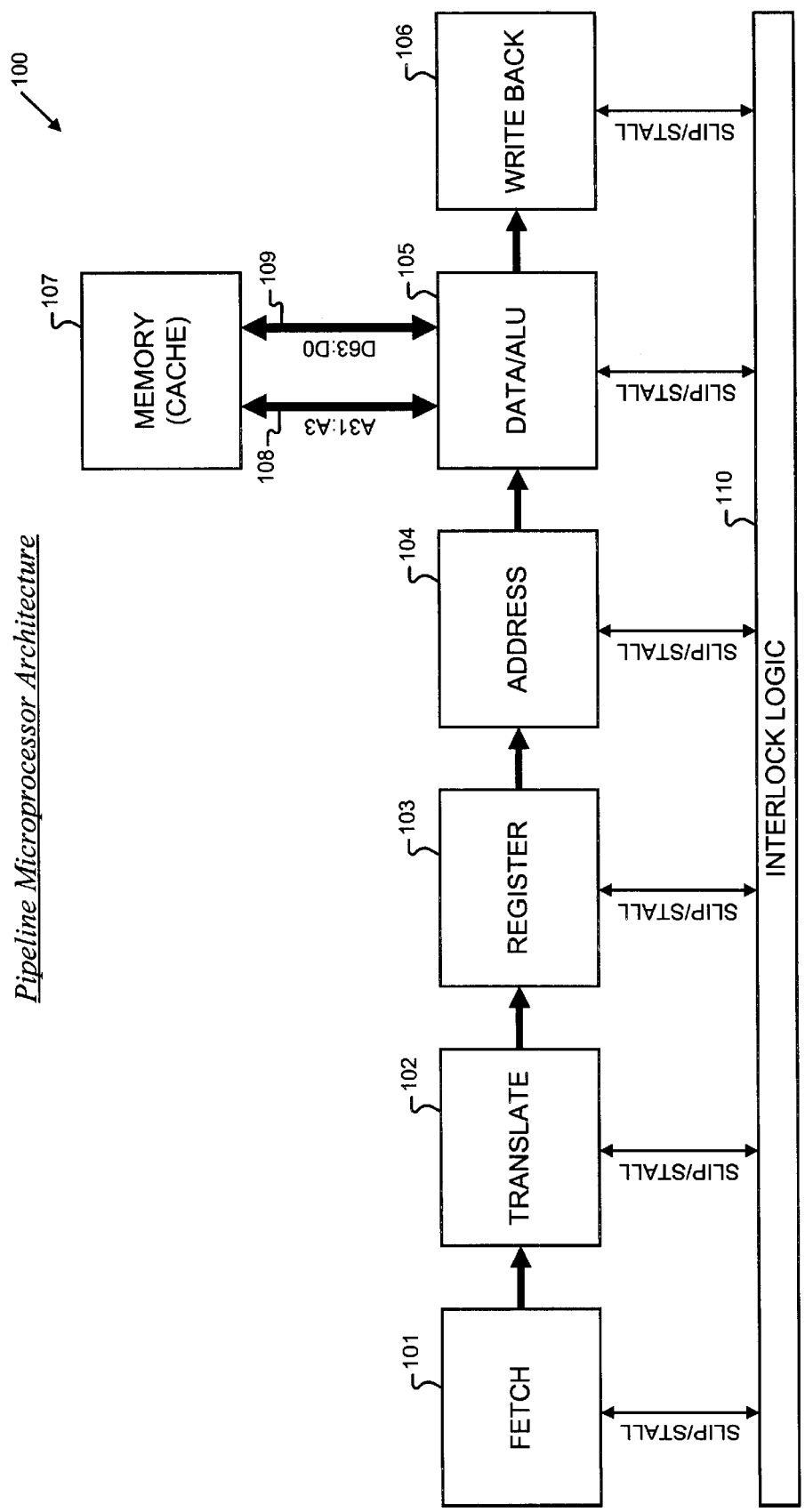
FIG. 1 is a block diagram of a related art microprocessor employing a 64-bit data bus to access memory operands.

Now referring to FIG. 1, a block diagram is presented of a related art microprocessor 100 that employs a 64-bit data bus 109 to access memory operands. The microprocessor 100 includes a fetch stage 101, a translate stage 102, a register stage 103, an address stage 104, a data/ALU stage 105, and a write back stage 106. Interlock logic 110 is coupled to each of the stages 101–106. The data/ALU stage 105 interfaces to a memory (cache) 107 via an address bus 108 and the 64-bit data bus 109.

Operationally, the fetch stage 101 retrieves macro instructions from external instruction memory (not shown) that are to be executed by the microprocessor 100. The translate stage 102 translates, or decodes, the fetched macro instructions into associated micro instructions, which are provided in sequence for execution by subsequent stages 103–106 of the microprocessor 100. The register stage 103 retrieves register operands prescribed by the micro instructions from a register file (not shown) for use within subsequent stages 104–106 of the pipeline. The address stage 104 generates memory addresses prescribed by the micro instructions to be used in data storage or retrieval operations. The data/ALU stage 105 performs arithmetic, logical, or other prescribed operations using the register operands retrieved from the register file. In addition, the data/ALU stage 105 accesses (i.e., reads or writes) the memory (cache) 107 to load or store memory operands using the addresses generated by the address stage 104. The write back stage 106 updates specified registers in the register file with the results or with the memory operands provided by the data/ALU stage 105. Instructions proceed in sequence through each successive stage of the pipeline in synchronization with a pipeline clock signal (not shown) To achieve optimum pipeline performance, while a given micro instruction is executing in a given stage of the pipeline, a preceding micro instruction should be executing in a subsequent pipeline stage and a following micro instruction should be executing in a previous pipeline stage. In other words, during any given clock cycle, all stages 101–109 of the microprocessor 100 should be performing their architected functions; no stage should sit idle. Furthermore, the performance of the pipeline is maximized if the number of clock cycles that are required to execute tasks within each of the stages 101–106 are equally balanced between each of the stages 101–106. In particular, the efficiency of the pipeline is decreased when one or more pipeline stages 101–106 require an inordinate number of clock cycles to process instructions. Of course, the goal for a microprocessor designer is to provide a design where each micro instruction within an instruction set be takes only one clock cycle to execute within each of the stages 101–109.

Yet, a present day microprocessor 100 is a very complex device that is capable of executing a tremendous number of diverse functions. And these functions can be combined in an almost uncountable number of ways. Hence, the circumstances for ideal pipeline efficiency are rarely, if ever, attained. Because of this, the interlock logic 110 plays an important role in the microprocessor's performance. The interlock logic 110 monitors the execution status of instructions within each stage 101–109 of the pipeline and accordingly adjusts the flow of instructions in preceding and subsequent stages. For example, if an instruction in the address stage 104 requires more than one clock cycle to execute, the interlock logic 110 will stall instructions that are executing in the preceding stages 101–103 to preclude them from prematurely advancing. At the same time, the interlock logic 110 may allow instructions executing in subsequent pipeline stages 105–106 to proceed since their execution need not be adversely affected by delay of the instruction in the address stage 104. The interlock logic 110 thus inserts slips or voids in the pipeline instruction sequence when instructions in subsequent stages 105–106 are allowed to advance because of a stalled instruction in a previous stage 104.

Perhaps the most significant problem experienced by present day microprocessors 100 is the delay incurred when accessing devices that are external to the microprocessor integrated circuit. For example, conventional data memory (not shown) within today's desktop computer systems is typically composed of dynamic random access memory (DRAM) devices that are much slower than logic internal to the microprocessor 100. In addition, communications over the address bus 108 and data bus 109 to these external devices cannot occur as fast as transmissions within the microprocessor 100 because the external transmissions occur over much greater distances. Today, it is not uncommon to find clock speeds internal to a microprocessor 100 that approach 1 GHz while accesses over the buses 108, 109 are constrained to 100 MHz.

Memory access delay has been a problem that has prompted innovations in the industry for many years. As a result, a number of helpful techniques have been developed to preclude delays that would otherwise be incurred when accessing external memory devices. One such technique, use of an internal memory cache 107, is illustrated in the block diagram. A memory cache 107 is a very fast memory device 107 that is internal to the microprocessor 100. Because the cache 107 is within the microprocessor 100, operands can typically be accessed in a single clock cycle, as contrasted with the many clock cycles needed to access operands in memory that is external to the microprocessor 100. And although it is faster, the memory cache 107 is typically much smaller in capacity than external memory. Consequently, logic within the microprocessor 100 endeavors to maintain copies of frequently accessed portions of external memory within the cache 107 so that when an instruction is executed that directs a memory access, the access will most likely be directed to the cache 107 rather than to external memory. It is beyond the scope of this application to provide an in-depth discussion of cache technologies and the techniques that are employed to ensure that frequently accessed parts of external memory are available when required by an application program. What is adequate to note herein, though, is that within a present day microprocessor 100, it is now presumed that most memory accesses will actually be to cache 107 rather than off-chip, thus saving a significant number of pipeline cycles.

Another practice employed to overcome the delays associated with accessing memory operands is the use of a multiple-byte data bus 109. Whereas earlier microprocessors were designed to access memory operands one byte per cycle, a present day microprocessor 100 provides a data bus 109 that is capable of accessing multiple bytes in parallel. At the present time, data buses 109 for microprocessors 100 used in desktop computer systems are capable of accessing eight bytes (i.e., a quadword) in parallel. Accordingly, the address bus 108 of FIG. 1 does not even provide bits 2:0 of a memory address. This is because all memory accesses over the buses 108, 109 are executed in 8-byte chunks and each access, regardless of the base address of an operand, begins at the next lower address that is evenly divisible by eight. More specifically, when an instruction directs the microprocessor to retrieve a memory operand, regardless of whether the operand's size is eight bytes or less (i.e., 1 byte, 2 bytes, or 4 bytes in present day systems), a complete eight bytes are retrieved over the data bus 109. Logic within the data/ALU stage 105 is employed to select the specific bytes containing the operand from within the retrieved eight bytes.

Multiple-byte data buses 109 are very efficient for accessing memory operands, as long as the operands are completely contained within a particular 8-byte address range.

When an operand is completely contained within an 8-byte address range, the operand is referred to as an aligned operand. To access an aligned operand only requires the execution of one access instruction because all of the bytes of the aligned operand are contained within the 8-byte address range. However, if an operand spans more than one 8-byte address range, then it is referred to as a misaligned operand. Multiple access instructions must be executed in a specific order to completely access the misaligned operand. For instance, a 4-byte operand residing at address 00000032h is aligned within an 8-byte address range beginning at address 00000030h. To access the 4-byte operand, only one access instruction is required. The access instruction directs the data/ALU stage 105 to access addresses 00000037h–00000030h in the cache 107. The 4-byte operand is therefore completely contained within the accessed locations. On the other hand, if the address of a 2-byte operand is 00000037h, then the 2-byte operand is misaligned. This is because one byte of the operand is within a first 8-byte address range (00000037h–00000030h) and a second byte is within a second 8-byte address range (0000003Fh–00000038h). Consequently, two access instructions need be executed to retrieve the misaligned 2-byte operand from the cache 107. When a misaligned operand is accessed by the data/ALU stage 105, the interlock logic 110 stalls instructions that are executing in preceding stages 101–104 so that the additional access instructions can be executed.

In addition to alignment, several other factors can affect the efficiency with which memory operands are accessed. One of these factors corresponds to the location of an operand within a memory page. A memory page is an architectural feature used within present day desktop computer systems that allows an application program to simulate a large address space by using only a small amount of memory (i.e., DRAM) and some disk storage. When paging is employed, the address space of an application program is typically divided into 4 kilobyte (kB) blocks, called memory pages. As requirements arise for access to instructions and/or data within particular pages of memory, these pages are transferred back and forth between a disk storage device and DRAM. And while most of these swapping tasks are transparently accomplished from the standpoint of an application program that is executing on the microprocessor 100, there is a significant amount of logic within the microprocessor 100 that is dedicated to accomplishing smooth and transparent page swaps.

In addition to allowing a program to simulate a large address space through paging, present day paging schemes also allow a programmer to map a simulated address that is generated within the application program to a physical address that is employed to access operands within a memory page. Simulated addresses are more commonly known as linear addresses or virtual addresses. In a 32-byte virtual addressing scheme, typically the lower 12 bits of a virtually address are used to index into a particular 4 kB memory page. These lower 12 bits, bits 11:0 are referred to as a page offset. Consequently, the lower 12 bits of a linear address are the same as the lower 12 bits of a corresponding physical address. Accordingly, the lower 12 bits of a linear address are referred to as the offset bits. The upper 20 bits of a linear address, however, typically index into two levels of tables that provide information used to identify a characterize the particular 4 kB memory page within which the page offset is to be used. It is not within the scope of this application to provide a comprehensive tutorial on how different paging schemes employ these two levels of tables to effect the translation of a virtual address to a physical address, however, one skilled in the art will appreciate that virtual-to-physical address translation is a task that requires access to at least two page information tables, which are also located in memory. In an x86-compatible microprocessor these two sets of tables are known as page directories and page tables. And to preclude the access delays associated with address translation, a present day microprocessor 100 typically provides a small internal cache (not shown) that contains the most recently accessed page information tables. This small cache is called a translation lookaside buffer (TLB). And although use of a TLB avoids the overwhelming delays that would otherwise be incurred each time a virtual address is translated into a physical address, table lookups in the TLB are still required for each memory access operation. These lookups are sometimes referred to as a TLB table walk, or more simply, a table walk.

In addition to address translation, paging also provides a programmer with the capability to assign access privileges for each 4 kB memory page. For example, a given memory page containing read-only operands may be designated as such by setting a read-only bit within the corresponding page information table entries for the given page. In addition, bits within the page information table entries can also be set to allow only operating system applications or device driver applications to access certain memory pages while restricting access to those certain pages by user applications. Hence, each time memory page is accessed, access to the page must be validated prior to the start of an access cycle. Address translation and page access validation typically are performed simultaneously during a TLB table walk because the page information table entries contain information used for both address translation and access validation.

Figure 2:
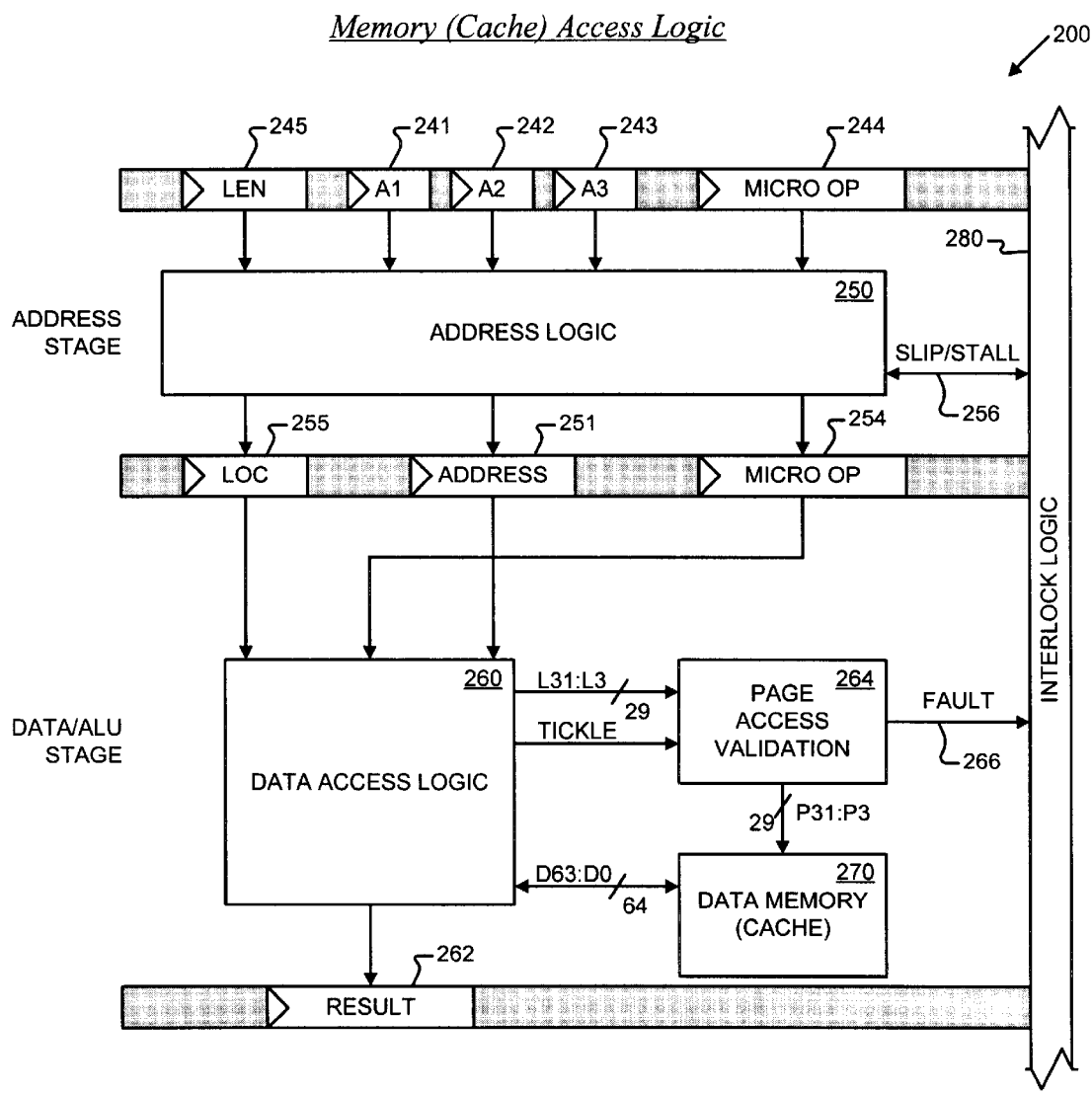
FIG. 2 is a block diagram illustrating details of an address stage and a data/ALU stage within the related art pipeline microprocessor of FIG. 1.

Now referring to FIG. 2, a block diagram 200 is presented illustrating details of an address stage and a data/ALU stage within the related art pipeline microprocessor 100 of FIG. 1. The block diagram 200 depicts address logic 250 within the address stage. The address logic 250 receives address operands A1, A2, and A3 from address operand buffers 241–243. In addition, the address logic 250 receives micro instruction opcodes from a micro opcode buffer 244 and an operand length from an operand length buffer 245. The address logic 250 provides a linear address output to an address buffer 251, a micro opcode output to micro opcode buffer 254, and an operand location output to a location buffer 255. Within the data/ALU stage, data access logic 260 receives contents of the micro opcode buffer 254, the linear address buffer 251, and a location buffer 255. The data access logic 260 is interfaced to page access validation logic 264 via a linear address bus, L31:L3 and a tickle signal, TICKLE. The page access validation logic 264 is coupled to a data cache 270 via a physical address bus, P31:P3. The cache 270 is interfaced to the data access logic 260 via a 64-bit data bus, D63:D0. The data access logic 260 provides an output to a result register 262. The page access validation logic 264 provides a page fault output 266, FAULT, to interlock logic 280.

In operation, when the microprocessor 100 executes a micro instruction that directs access to a memory operand, the micro opcode of the micro instruction is provided to the address logic 250 along with the memory operand's length in bytes via buffers 244 and 245. In addition, address parameters that the address logic 250 uses to compute the linear address of the memory operand are retrieved from the register file and are provided in buffers 241–243. In an x86-compatible processor, A1 typically contains a segment base address, A2 contains a base address, and A3 contains a displacement. Generally, these three address parameters are summed to generate the linear address.

Once the linear address is generated, the address logic 250 uses the operand's length to determine whether or not the memory operand is aligned within an 8-byte addressable memory range. If the memory operand is aligned, then the address logic generates a single access instruction (i.e., a load or a store instruction) directing the data access logic 260 to access the 8-byte address range containing the memory operand. The micro opcode for this access instruction is placed in opcode buffer 254. The reference address for the 8-byte address range is provided in buffer 251. The location of the memory operand within the 8-byte address range is provided in the location buffer 255.

For single-cycle loads and stores, the data access logic 260 issues the 8-byte address range reference address over the linear address bus, L31:L3, to the page access validation logic 264. The page access validation logic 264 performs a TLB table walk to translate the linear reference address to a corresponding physical reference address. In addition, memory page access privileges are checked by the page access validation logic 264. If access to a corresponding memory page is allowed, then the page access validation logic 264 issues the corresponding physical reference address over the physical address bus, P31:P3, to the cache 270. The cache 270, in turn, accesses the memory operand within the 8-byte address range over the 64-bit data bus, D63:D0. For loads, the operand is provided to the data access logic 260 over the data bus, D63:D0; for stores, the data access logic 260 provides the operand to the cache 270 over the data bus D63:D0. If the directed operation is a load operation, then the data access logic 260 uses the contents of the location buffer 255 to select the memory operand from within the retrieved eight bytes and the operand is output to the result register 262.

But if access to the corresponding memory page is not allowed, then the page access validation logic 264 indicates that a page fault has occurred by asserting the page fault signal, 266, FAULT. In the event of a page fault, the interlock logic 280 halts execution of the access instruction and transfers program control to instructions that are designed to deal with page faults. A description of the techniques used to handle faults is not particularly relevant to this discussion. But what is notable, however, is that a page fault constitutes a serious program error that must be carefully managed. Accordingly, when a page fault occurs, the normal flow of an application program is radically altered in order to gracefully deal with the error condition without causing a system crash.

In contrast to the execution of aligned operand accesses, if the address logic 250 determines that access is directed to a misaligned memory operand, then the access cannot be performed in a single load/store cycle. Consequently, the address logic 250 signals the interlock logic 280 via bus 256 to stall the pipeline. The pipeline must be stalled while the address logic 250 generates a sequence of three instructions that together perform the access of the misaligned memory operand. Three instructions are required because the operand, as well as being misaligned between two 8-byte address ranges, may actually reside in two distinctly different memory pages having different access privileges. And to preclude a page fault from occurring when only part of the operand has been accessed, the initial instruction that is generated by the address logic 250 directs the page access validation logic 264 to verify access privileges for a second 8-byte address range containing a second part of the operand. This initial instruction is called an access tickle instruction because it directs the page access validation logic 264 to check for a page fault corresponding to the second 8-byte address range, without actually directing that the second part of the misaligned operand be accessed. Thus the second address range is "tickled" determine if a page fault will occur during a future pipeline cycle when a following instruction directs access to the second part of the misaligned operand. If the page fault occurs during execution of the tickle instruction, then the misaligned access operation is halted altogether prior to the transfer of any parts of the operand.

Following the access tickle instruction, the address generation logic 250 provides a first access instruction that directs the data access logic 260 to access a first part of the misaligned operand in a first 8-byte addressable range. Next, the address generation logic 250 provides a second access instruction that directs the data access logic 260 to access the second part of the misaligned operand within the second 8-byte addressable range. Page access privileges are checked as well during execution of both the first and second access instructions. And although it is evident that this 3-instruction misaligned access sequence performs page validations twice for the second 8-byte addressable range, it is noted that execution of the tickle operation is required to preclude a page fault from occurring in the middle of an access to a misaligned operand. The importance of performing a tickle can particularly be appreciated if the misaligned operand access operation is a write to memory. In the absence of a tickle instruction, the possibility exists that only part of the misaligned operand would be written to memory if page access is not permitted to the second of two memory pages that contains a second part of the misaligned operand. Thus, the tickle instruction is employed to eliminate the possibility that such a situation might occur.

Now referring to FIG. 3, a timing diagram 300 is presented illustrating how the microprocessor 100 of FIGS. 1 and 2 accesses both aligned and misaligned memory operands. The timing diagram 300 depicts the execution of a first macro instruction, MOV EAX, [EBX], followed at some later time by the execution of a second macro instruction, MOV EAX, [EBX+1]. The first macro instruction directs the microprocessor 100 to load an aligned 32-bit memory operand into register EAX in the register file. The address of the aligned memory operand is prescribed by the contents of register EBX in the register file. For the purposes of illustration, assume that the contents of EBX are 00000034h. Hence, the 32-bit aligned operand referenced by the first macro instruction is contained completely within the 8-byte address range 00000037h–00000030h because the operand resides in addresses 00000037h–00000034h. The second macro instruction directs the microprocessor 100 to load a misaligned 32-bit memory operand into register EAX. The address of the aligned memory operand is prescribed by the sum of the contents of register EBX and a displacement of 1. Still maintaining the assumption for this example that the contents of EBX are 00000034h, it follows then that the 32-bit misaligned operand is split between a first 8-byte address range of 00000037h–00000030h and a second 8-byte address range of 0000003Fh–00000038h because the operand actually resides in addresses 00000038h–00000035h. Progression of the two macro instructions through successive stages of the microprocessor 100 are shown with respect to cycles of a pipeline clock. For clarity, columns corresponding to the fetch and write back stages 101, 106 are not shown. The marks "- - -" designate slips/stalls that are inserted into the pipeline by the interlock logic 280. The marks "****" indicate non-relevant instructions that precede or follow instructions of interest.

During cycle 1, the first macro instruction proceeds through the translate stage 102. Therein it is translated into a load micro instruction, designated as LD EAX, [EBX]. More specifically, a micro opcode, LD, directs the microprocessor 100 to fetch contents of register EBX in the register stage 103 and provide this address parameter to the address logic 250 for generation of a linear address of the aligned 32-bit operand. The load micro instruction further directs that the 32-bit aligned operand be retrieved from memory (cache 270) by the data access logic 260 and that it be written into register EAX by the write back logic 106.

During cycle 2, the load micro instruction proceeds through the register stage 103, wherein contents of register EBX are retrieved and provided in one of the three address parameter buffers 241–243. In addition, the length of the aligned operand (i.e., four bytes) is provided in buffer 245.

During cycle 3, the load micro instruction proceeds through the address stage 104. Therein, the address logic 250 retrieves the contents of buffers 241–245 and generates the linear address of the aligned memory operand, in this example, the linear address being 00000034h. In addition, the address logic 250 adds the operand length retrieved from buffer 245 to the linear address and determines that the operand is indeed aligned and that it can be retrieved by a single load instruction. Accordingly, the address logic 250 issues the opcode for the single load instruction to opcode buffer 254, the reference address (00000030h) for the 8-byte address range containing the operand to the address register 251, and information prescribing that the operand is located in the upper four bytes of the 8-byte address range to the location buffer 255.

During cycle 4, the load micro instruction designating a 1-cycle load referenced at linear address 00000030h proceeds through the data/ALU stage 105. Therein, the linear address is provided via L31:L3 to the page access validation logic 264. The page access validation logic 264 executes a TLB table walk to translate the linear address to a physical address and to determine access privileges for the memory page within which the 8-byte address range resides. If access to the page is allowed, then the physical address of the 8-byte address range is provided to the cache 270 via P31:P3 and the cache 270 provides the data corresponding to the 8-byte address range to the data access logic 260 via D63:D0. The data access logic 260 uses the information in the location buffer 255 to select the 32-byte aligned operand from the upper four bytes of the 8-byte address range. The aligned operand is then output to the result register 262. Of course, if access to the memory page containing the aligned operand is not permitted, then the page access validation logic 264 would assert FAULT 266 and the interlock logic 280 would accordingly transfer control to page fault handling instructions.

Now during cycle 11, the second macro instruction proceeds through the translate stage 102. Therein it is translated into a load micro instruction, designated as LD EAX, [EBX—1]. More specifically, a micro opcode, LD, directs the microprocessor 100 to fetch contents of register EBX in the register stage 103 and provide this address parameter, along with a displacement of 1, to the address logic 250 for generation of a linear address corresponding to a 32-bit operand. The load micro instruction further directs that the 32-bit operand be retrieved from memory (cache 270) by the data access logic 260 and that it be written into register EAX by the write back logic 106. During cycle 12, the load micro instruction proceeds through the register stage 103, wherein contents of register EBX are retrieved and provided, along with the displacement, 1, in two of the three address parameter buffers 241–243. In addition, the length of the aligned operand (i.e., four bytes) is provided in buffer 245.

During cycle 13, the load micro instruction proceeds through the address stage 104. Therein, the address logic 250 retrieves the contents of buffers 241–245 and generates the linear address of the aligned memory operand, in this example, the linear address being 00000035h. In addition, the address logic 250 adds the operand length retrieved from buffer 245 to the linear address and determines that the operand is misaligned and must be retrieved by a 3-instruction load sequence. Because three instructions must be executed to retrieve the misaligned operand, the address logic 250 asserts SLIP/STALL 256, thus directing the interlock logic 280 to stall the pipeline. In addition, the address logic 250 issues the opcode for an access tickle instruction to opcode buffer 254, prescribing a reference address (00000038h) for a second 8-byte address range containing a second part of the misaligned operand to the address register 251.

During cycle 14, the access tickle instruction proceeds through the data/ALU stage 105. Therein, a second linear address, 00000030h is provided via L31:L3 to the page access validation logic 264. In addition the data access logic 260 asserts TICKLE to direct the page access logic 264 to only perform a page access validation for the second 8-byte address range; the data is not to be retrieved. The page access validation logic 264 executes a TLB table walk to perform a virtual-to-physical address translation and to determine access privileges for the memory page within which the second 8-byte address range resides. If access to the page is allowed, then the tickle instruction just falls through to the next pipeline stage 106. However, if access to the memory page containing the second part of the misaligned operand is not permitted, then the page access validation logic 264 would assert FAULT 266 and the interlock logic 280 would transfer control to page fault handling instructions prior to fetching any part of the misaligned operand from the cache 270.

During cycle 15, a first access instruction, LD EAX, 00000038h, proceeds through the data/ALU stage 105. Therein, a first linear address, 00000038h is provided via L31:L3 to the page access validation logic 264. The page access validation logic 264 executes a TLB table walk to translate it into a first physical address and to determine access privileges for the memory page within which the first 8-byte address range resides. If access to the page is allowed, then the physical address of the first 8-byte address range is provided to the cache 270 via P31:P3 and the cache 270 provides the data corresponding to the first 8-byte address range to the data access logic 260 via D63:D0. The data access logic 260 uses the information in the location buffer 255 to select the first part of the 32-byte misaligned operand from the lower byte of the 8-byte address range beginning at 00000038h. The first part of the misaligned operand is then output to the result register 262. Of course if access to the memory page containing the first part of the misaligned operand is not permitted, then the page access validation logic 264 would assert FAULT 266 and the interlock logic 280 would transfer control to page fault handling instructions.

During cycle 16, a second access instruction, LD EAX, 00000030h, proceeds through the data/ALU stage 105. Therein, the second linear address, 00000030h is provided via L31:L3 to the page access validation logic 264. The page access validation logic 264 executes another TLB table walk to determine access privileges for the memory page within which the second 8-byte address range resides. But the result of the table walk is the same for this instruction as it was for the tickle instruction because the same page information entries are being accessed. Accordingly, if access to the page is allowed, then the physical address of the second 8-byte address range is provided to the cache 270 via P31:P3 and the cache 270 provides the data corresponding to the 8-byte address range to the data access logic 260 via D63:D0. The data access logic 260 uses the information in the location buffer 255 to select the second part of the 32-byte aligned operand from the upper three bytes of the 8-byte address range beginning at 00000030h. The second part of the misaligned operand is then output to the result register 262 and concatenated with the first part to form a complete 32-bit operand.

As alluded to above, it is necessary to perform a tickle operation when accessing misaligned operands in order to preclude circumstances from arising where an operand is only partially read from cache 270 or written to cache 270 when a page fault occurs. And this peculiar circumstance can only happen if a first part of a misaligned operand is accessed within a first memory page and a second part of the misaligned operand is accessed within a second memory page, where the access privileges of the two memory pages are different.

Although use of the tickle instruction obviates the potential for a catastrophic event to occur within a computer system, the present inventors have observed that the conditions that would allow such an event to take place have an extremely small probability of taking place. Stated differently, the present inventors have noted that virtually all accesses to misaligned memory operands do not cross memory page boundaries; they occur within a single memory page. Because of this, the present inventors have concluded then that virtually all misaligned memory operand access sequences contain a redundant an unnecessary tickle instruction.

Therefore, the present invention is provided to overcome the current limitations of a present day microprocessor when the microprocessor is employed to access misaligned memory operands. The present invention provides an apparatus and method for checking the location of a misaligned memory operand with regard to a memory page boundary prior to the generation of a misaligned access instruction sequence. If it is determined that the misaligned operand is to be accessed within a single memory page, the present invention eliminates the tickle instruction from the sequence. The present invention is more specifically described with reference to FIGS. 4 through 7.

Figure 4:
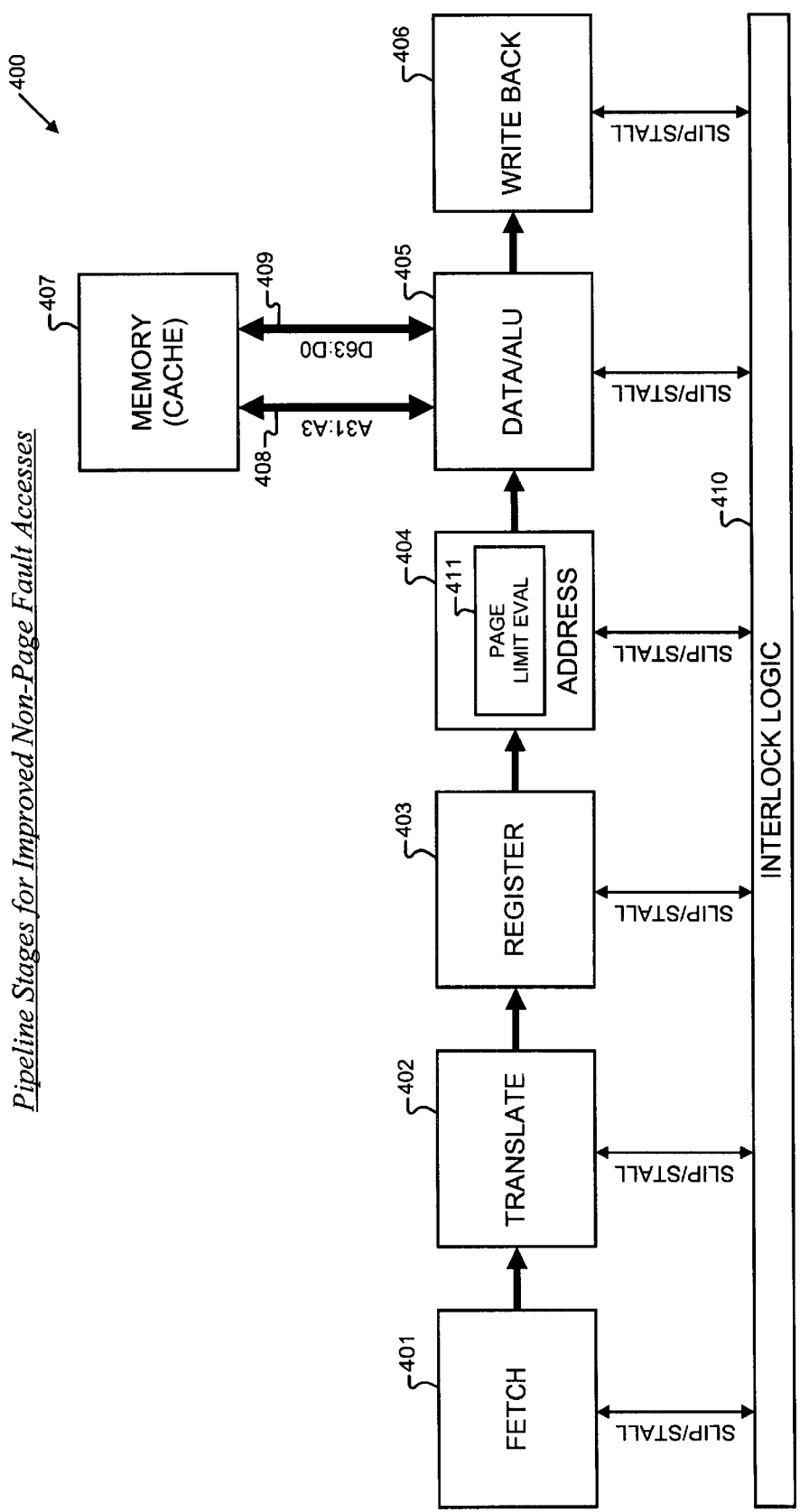
FIG. 4 is a block diagram of a microprocessor according to the present invention that eliminates a tickle cycle for a misaligned access when the operand being accessed is contained within a single memory page.

Now referring to FIG. 4, a block diagram is presented of a microprocessor 400 according to the present invention that eliminates a tickle cycle for a misaligned access when the operand being accessed is contained within a single memory page. The microprocessor 400 includes a fetch stage 401, a translate stage 402, a register stage 403, an address stage 404, a data/ALU stage 405, and a write back stage 406. Interlock logic 410 is coupled to each of the stages 401–406. The data/ALU stage 405 interfaces to a memory (cache) 107 via an address bus 408 and the 64-bit data bus 409. Within the address stage 404, page limit evaluation logic 411 is provided.

Operationally, the fetch stage 401 retrieves macro instructions from external instruction memory (not shown) that are to be executed by the microprocessor 400. The translate stage 402 translates, or decodes, the fetched macro instructions into associated micro instructions, which are provided in sequence for execution by subsequent stages 403–406 of the microprocessor 400. The register stage 403 retrieves register operands as specified by the micro instructions from a register file (not shown) for use within subsequent stages 404–406 of the pipeline. The address stage 404 generates memory addresses prescribed by the micro instructions to be used in data storage or retrieval operations. The data/ALU stage 405 performs arithmetic, logical, or other prescribed operations using the register operands retrieved from the register file. In addition, the data/ALU stage 405 accesses (i.e., reads or writes) the memory (cache) 407 to load or store memory operands. The write back stage 406 updates specified registers in the register file with the results or memory operands provided by the data/ALU stage 405. Instructions proceed in sequence through each successive stage of the pipeline in synchronization with a pipeline clock signal (not shown).

With regard to accessing memory operands, the elements 401–410 of the microprocessor 400 according to the present invention operate in a manner similar to like-number elements of the microprocessor depicted in FIG. 1, the hundreds digit being replaced with a 4. Logic within the address stage 404 determines whether or not a memory operand is aligned within an 8-byte address range. If the operand is aligned, then a 1-cycle access is performed to retrieve/store the aligned operand from/to cache 407. The benefits inherent in the present invention are experienced, however, when an access is directed to a misaligned memory operand.

In contrast to a present day microprocessor 100, the microprocessor 400 according to the present invention includes a page boundary evaluator 411 that is employed to determine whether or not a misaligned memory operand is to be accessed within a single 4 kB memory page. If the page boundary evaluation logic 411 determines that the access is within a single memory page, then generation of a tickle instruction is precluded. If both parts of the misaligned memory operand lie within a single memory page, then the access validation performed to access a first part of the operand will yield access permissions that are consistent with a validation to the same page to retrieve a second part of the misaligned operand. Hence, elimination of the tickle instruction in this case does not create a situation whereby a page fault can occur for one part of the operand without regard to the other part. The number of instructions required to access misaligned operands that do not cross a memory page boundary is reduced from three instructions to two instructions. This is a significant savings when viewed from the standpoint of an application program consisting of many misaligned operand accesses because virtually all of these operands will reside within a single memory page. At a gross level, for 32-bit operands within a 4 kB memory paging scheme, more than 99 percent of the misaligned access operations will be accelerated through employment of the present invention.

Figure 5:
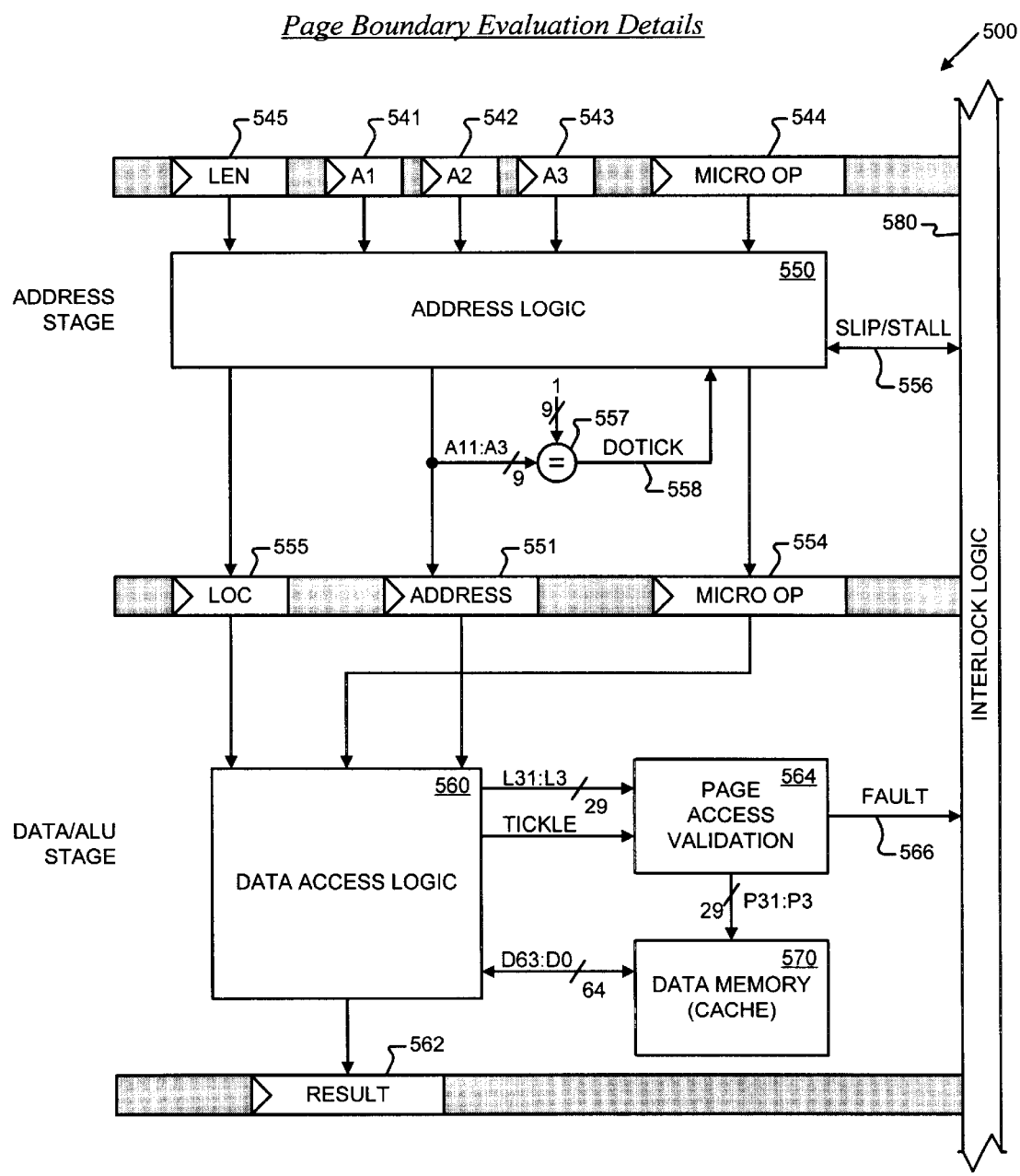
FIG. 5 is a block diagram illustrating details of an address stage and a data/ALU stage within the microprocessor of FIG. 4.

Now referring to FIG. 5, a block diagram 500 is presented illustrating details of an address stage and a data/ALU stage within the microprocessor of FIG. 4. The block diagram 500 depicts address logic 550 within the address stage. The address logic 550, or load/store instruction logic 550, receives address operands A1, A2, and A3 from address operand buffers 541–543. In addition, the address logic 550 receives micro instruction opcodes from a micro opcode buffer 244 and an operand length field from an operand length buffer 545. The address logic 550 provides a linear address output to an address buffer 551, a micro opcode output to micro opcode buffer 554, and an operand location output to a location buffer 555. In addition, the address stage logic includes page limit evaluation logic 557 that receives selected bits of the linear address and provides a tickle enable signal 558, DOTICK, back to the address logic 550. The selected bits are the bits corresponding to a memory page offset. In one embodiment, the selected bits are bits 11:3 of the linear address, and the page limit evaluator 557 is a 9-bit comparator.

Within the data/ALU stage, data access logic 560 receives contents of the micro opcode buffer 554, the linear address buffer 551, and a location buffer 555. The data access logic 560 is interfaced to page access validation logic 564 via a linear address bus, L31:L3 and a tickle signal, TICKLE. The page access validation logic 564 is coupled to a data cache 570 via a physical address bus, P31:P3. In one embodiment, the cache 570 is interfaced to the data access logic 560 via a 64-bit data bus, D63:D0. The data access logic 560 provides an output to a result register 562. The page access validation logic 564 provides a page fault output 566, FAULT, to interlock logic 580.

Operationally, when the microprocessor 400 executes a micro instruction that directs access to a memory operand, the micro opcode of the micro instruction is provided to the address logic 550 along with the memory operand's length in bytes via buffers 544 and 545. In addition, address parameters that the address logic 550 uses to compute the linear address of the memory operand are retrieved from the register file and are provided in buffers 541–543.

The address logic 550 uses the operand's length to determine whether or not the memory operand is aligned within an 8-byte addressable memory range. If the memory operand is aligned, then the address logic 550 generates a single access instruction (i.e., a load or a store instruction) directing the data access logic 560 to access the memory operand within the 8-byte address range. The micro opcode for this access instruction is placed in opcode buffer 554. The reference address for the 8-byte address range is provided in buffer 551. The location of the memory operand within the 8-byte address range is provided in the location buffer 555.

For single-cycle loads and stores, logic elements within the address and data/ALU stages of the microprocessor 400 according to the present invention function very much like like-numbered elements of the microprocessor 100 discussed with reference to FIG. 2, the hundreds digit being replaced with a 5.

In contrast to a present day microprocessor, however, the advantages provided by the present invention are experienced when the address logic 550 determines that access is directed to a misaligned memory operand. Because the access cannot be accomplished by a single load/store cycle, the load/store instruction generator 550 signals the interlock logic 580 via bus 556 to stall the pipeline. But prior to generating an access tickle instruction as part of a sequence of three instructions to access the misaligned memory operand, the address logic 550 first generates a linear address of a first 8-byte address range containing a first part of the misaligned operand. The offset bits, in one embodiment bits A11:A3, are provided to the page boundary evaluator 557. If all of the selected bits are set, then this indicates that the misaligned operand does indeed cross a 4 kB page boundary. Accordingly, the page limit evaluation logic 557 directs the address logic 550 via DOTICK 558 to proceed with generation of a tickle instruction. However, if all of the selected offset bits are not set, then this indicates that both parts of the misaligned operand reside within the same memory page; no tickle instruction is required. When all of the selected offset bits are not set, then the page boundary evaluation logic 557 directs the address logic 550 via DOTICK 558 to eliminate generation of the tickle instruction from the misaligned access sequence. Consequently, the address logic 550 generates two access instructions to access the misaligned operand: a first access instruction directing the data access logic 560 to access a first part of the misaligned operand within a first 8-byte address range and a second access instruction directing the data access logic 560 to access a second part of the misaligned operand within a second 8-byte address range.

Now referring to FIG. 6, a timing diagram 600 is presented illustrating how the microprocessor of FIGS. 4 and 5 accesses both aligned and misaligned memory operands. The timing diagram 600 depicts the execution of a first macro instruction, MOV EAX, [EBX], followed at some later time by the execution of a second macro instruction, MOV EAX,[EBX+1]. The first macro instruction directs the microprocessor 400 to load an aligned 32-bit memory operand into register EAX in the register file. The address of the aligned memory operand is prescribed by the contents of register EBX in the register file. For the purposes of illustration, assume that the contents of EBX are 00000034h. Hence, the 32-bit aligned operand referenced by the first macro instruction is contained completely within the 8-byte address range 00000037h–00000030h because the operand resides in addresses 00000037h–00000034h. The second macro instruction directs the microprocessor 400 to load a misaligned 32-bit memory operand into register EAX. The address of the aligned memory operand is prescribed by the sum of the contents of register EBX and a displacement of 1. Still maintaining the assumption for this example that the contents of EBX are 00000034h, it follows then that the 32-bit misaligned operand is split between a first 8-byte address range of 00000037h–00000030h and a second 8-byte address range of 0000003Fh–00000038h because the operand actually resides in addresses 00000038h–00000035h. Progression of the two macro instructions through successive stages of the microprocessor 400 are shown with respect to cycles of a pipeline clock. For clarity, columns corresponding to the fetch and write back stages 401, 406 are not shown. The marks "- - -" designate slips/stalls that are inserted into the pipeline by the interlock logic 280. The marks "****" indicate non-relevant instructions that precede or follow instructions of interest.

During cycle 1, the first macro instruction proceeds through the translate stage 402. Therein it is translated into a load micro instruction, designated as LD EAX, [EBX]. More specifically, a micro opcode, LD, directs the microprocessor 400 to fetch contents of register EBX in the register stage 403 and provide this address parameter to the address logic 550 for generation of a linear address of the aligned 32-bit operand. The load micro instruction further directs that the 32-bit aligned operand be retrieved from memory (cache 570) by the data access logic 560 and that it be written into register EAX by the write back logic 406.

During cycle 2, the load micro instruction proceeds through the register stage 403, wherein contents of register EBX are retrieved and provided in one of the three address parameter buffers 541–543. In addition, the length of the aligned operand (i.e., four bytes) is provided in buffer 545.

During cycle 3, the load micro instruction proceeds through the address stage 404. Therein, the address logic 550 retrieves the contents of buffers 541–545 and generates the linear address of the aligned memory operand, in this example, the linear address being 000000034h. In addition, the address logic 550 adds the operand length retrieved from buffer 545 to the linear address and determines that the operand is indeed aligned and that it can be retrieved by a single load instruction. Accordingly, the address logic 550 issues the opcode for the single load instruction to opcode buffer 554, the reference address (00000030h) for the 8-byte address range containing the operand to the address register 551, and information prescribing that the operand is located in the upper four bytes of the 8-byte address range to the location buffer 555.

During cycle 4, the load micro instruction designating a 1-cycle load referenced at linear address 00000030h proceeds through the data/ALU stage 405. Therein, the linear address is provided via L31:L3 to the page access validation logic 564. The page access validation logic 564 executes a TLB table walk to translate the linear address to a physical address and to determine access privileges for the memory page within which the 8-byte address range resides. If access to the page is allowed, then the physical address of the 8-byte address range is provided to the cache 570 via P31:P3 and the cache 570 provides the data corresponding to the 8-byte address range to the data access logic 560 via D63:D0. The data access logic 560 uses the information in the location buffer 555 to select the 32-byte aligned operand from the upper four bytes of the 8-byte address range. The aligned operand is then output to the result register 562.

Now during cycle 11, the second macro instruction proceeds through the translate stage 402. Therein it is translated into a load micro instruction, designated as LD EAX, [EBX+1]. More specifically, a micro opcode, LD, directs the microprocessor 500 to fetch contents of register EBX in the register stage 503 and provide this address parameter, along with a displacement of 1, to the address logic 650 for generation of a linear address corresponding to a 32-bit operand. The load micro instruction further directs that the 32-bit operand be retrieved from memory (cache 670) by the data access logic 660 and that it be written into register EAX by the write back logic 506.

During cycle 12, the load micro instruction proceeds through the register stage 403, wherein contents of register EBX are retrieved and provided, along with the displacement, 1, in two of the three address parameter buffers 541–543. In addition, the length of the aligned operand (i.e., four bytes) is provided in buffer 545.

During cycle 13, the load micro instruction proceeds through the address stage 404. Therein, the address logic 550 retrieves the contents of buffers 541–545 and generates the linear address of the aligned memory operand, in this example, the linear address being 000000035h. In addition, the address logic 550 adds the operand length retrieved from buffer 545 to the linear address and determines that the operand is misaligned and must be retrieved by a multi-instruction load sequence. Accordingly, the address logic 550 asserts SLIP/STALL 556, thus directing the interlock logic 580 to stall the pipeline. In addition, the page limit evaluation logic 557 evaluates bits 11:3 of the linear address corresponding to the misaligned operand to determine whether or not the operand lies within a single memory page. And since all 9 upper bits of the offset are not set, the page boundary evaluator 557 signals the address logic 550 via DOTICK 558 to eliminate generation of an access tickle instruction for the multi-instruction sequence. Only two access instructions are required since the operand does not cross a 4 kB page boundary.

Hence, during cycle 14, a first access instruction, LD EAX, 00000030h, proceeds through the data/ALU stage 405. Therein, a first linear address, 00000030h is provided via L31:L3 to the page access validation logic 564. The page access validation logic 564 executes a TLB table walk to translate it into a first physical address and to determine access privileges. If access to the page is allowed, then the physical address of the first 8-byte address range is provided to the cache 570 via P31:P3 and the cache 570 provides the data corresponding to the first 8-byte address range to the data access logic 560 via D63:D0. The data access logic 560 uses the information in the location buffer 255 to select the first part of the 32-byte misaligned operand from the upper three bytes of the 8-byte address range beginning at 00000030h. The first part of the misaligned operand is then output to the result register 562. Of course if access to the memory page containing the misaligned operand is not permitted, then the page access validation logic 564 would assert FAULT 566 and the interlock logic 580 would transfer control to page fault handling instructions.

During cycle 15, a second access instruction, LD EAX, 00000038h, proceeds through the data/ALU stage 405. Therein, a second linear address, 00000038h is provided via L31:L3 to the page access validation logic 564. The page access validation logic 564 executes another TLB table walk to perform address translation and to determine access privileges. But it is assured that access privileges for this 8-byte address range are the same as for the first 8-byte address range because both address ranges are within the same memory page. Assuming that access to the page is allowed, then the physical address of the second 8-byte address range is provided to the cache 570 via P31:P3 and the cache 570 provides the data corresponding to the 8-byte address range to the data access logic 560 via D63:D0. The data access logic 560 uses the information in the location buffer 555 to select the second part of the 32-byte aligned operand from the lower byte of the 8-byte address range beginning at 00000038h. The second part of the misaligned operand is then output to the result register 562 and concatenated with the first part to form a complete 32-bit operand.

In contrast to a conventional microprocessor, most misaligned accesses using a microprocessor according to the present invention can be accomplished in two cycles rather than three. By eliminating a tickle cycle for accesses to misaligned operands that reside within a single memory page, the present invention allows application programs to run much faster and more efficiently that what has heretofore been provided.

Figure 7:
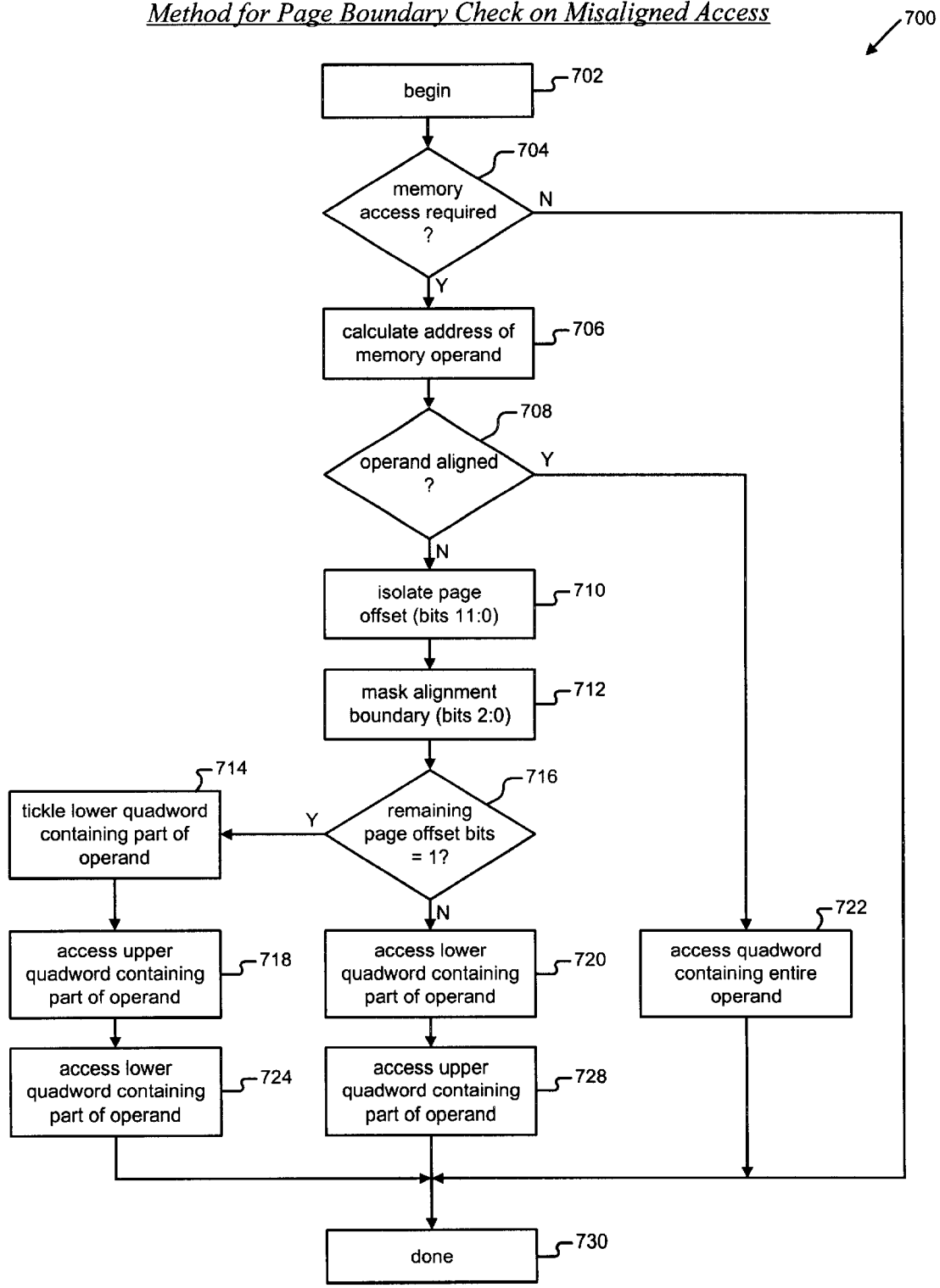
FIG. 7 is a flow chart illustrating a method according to the present invention for eliminating a page access tickle instruction when accessing both aligned and misaligned memory operands.

Now referring to FIG. 7, a flow chart 700 is presented illustrating a method according to the present invention for eliminating a page access tickle instruction when accessing both aligned and misaligned memory operands.

Flow begins at block 702, where an instruction in a microprocessor according to the present invention is provided to address stage logic. Flow then proceeds to decision block 704.

At decision block 704, the instruction is evaluated to determine whether or not access to an operand in memory is required. If so, then flow proceeds to block 706. If not, then flow proceeds to block 730.

At block 706, a linear address of the memory operand is generated by the address logic using address operands provided by preceding stages of the microprocessor. Flow then proceeds to decision block 708.

At decision block 708, using the linear address and information describing the length of the memory operand, logic in the address stage determines whether or not the memory operand can be accessed by a single load/store cycle (i.e., whether or not the operand is aligned). If the operand is aligned, then flow proceeds to block 722. If the operand is misaligned, then flow proceeds to bock 710.

At block 710, offset bits of the linear address corresponding to the size of a memory page within a paging scheme according to the present invention are isolated. In one embodiment, the paging scheme utilizes 4 kB memory pages, thus employing 12-bit page offsets. Flow then proceeds to block 712.

At block 712, memory access alignment bits are masked from the isolated offset bits. In one embodiment, the microprocessor according to the present invention employs a 64-bit data bus, thus providing for 8-byte aligned address ranges corresponding to bits 2:0. Flow then proceeds to decision block 716.

At decision block 716, the remaining offset bits are evaluated to determine if they are set, thus indicated that the misaligned memory operand resides in two distinct memory pages. If so, then flow proceeds to block 714. If the misaligned memory operand resides within a single memory page, then flow proceeds to block 720.

At blow 714, data/ALU stage logic in the microprocessor executes a tickle cycle on a lower address range containing a second part of the operand to determine if a future access to the lower address range will result in a page fault. Assuming that no page fault occurs, flow then proceeds to block 718.

At block 718, the data/ALU stage logic executes a first access instruction to access a first part of the operand within an upper address range. Assuming that access is permitted, the first part of the operand is accessed and flow proceeds to block 724.

At block 724, the data/ALU stage logic executes a second access instruction to access the second part of the operand within the lower address range. Assuming that access is permitted, the second part of the operand is accessed and flow proceeds to block 730.

At block 720, the data/ALU stage logic executes a first access instruction to access a first part of the operand within a lower address range. Assuming that access is permitted, the first part of the operand is accessed and flow proceeds to block 728.

At block 728, the data/ALU stage logic executes a second access instruction to access a second part of the operand within an upper address range. Assuming that access is permitted, the second part of the operand is accessed and flow proceeds to block 730.

At block 722, since the operand is aligned within a single address range, the data/ALU stage logic executes a single access instruction to access the operand within an address range corresponding to the size of the data bus according to the present invention. In one embodiment, the data bus is a 64-bit bus capable of accessing eight bytes (i.e., a quadword) in parallel. Assuming that access is permitted, the operand is accessed and flow proceeds to block 730.

At block 730, the method completes.

Although the present invention and its objects, features, and advantages have been described in detail, other embodiments are encompassed by the invention. For example, the present invention has been particularly described in terms of a 64-bit data bus capable of accessing eight bytes within a single load/store cycle. In addition, the present invention has been characterized a operating within a computer system having memory pages that are 4 kB in size. Although these detailed features are representative of present day technology, such embodiments does not restrict the applicability of the present invention. The present invention comprehends any data bus and memory page embodiments to the extent that multiple bytes of a memory page are accessed over the data bus within a single access cycle.

In addition, the present invention as been described in terms of instructions that direct access to memory operands. But the scope of the invention is not restricted to instructions that explicitly prescribe access to a memory operand, such as the x86 MOV instructions featured in FIGS. 3 and 6. One skilled in the art will appreciate that the scope of the present invention extends to those instructions that implicitly prescribe memory operands as well, such as arithmetic or logical instructions having an operand that resides in memory.

Furthermore, embodiments of the present invention have been discussed where elimination of a tickle cycle results in the generation of two access instructions: one of the instructions directing access to a lower address range and the other instruction directing access to an upper address range. One skilled in the art will appreciate that alternative embodiments of the present invention can be provided by altering the execution order of these two access instructions because the order of these instructions is inconsequential when a misaligned operand resides within a single memory page.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus in a microprocessor for accessing a misaligned memory operand, the apparatus comprising:

page boundary evaluation logic, configured to evaluate an address corresponding to the misaligned memory operand, and configured to determine whether or not access to the misaligned memory operand is within a single memory page; and address logic, coupled to said page boundary evaluation logic, configured to eliminate an access tickle instruction when access to the misaligned memory operand is within said single memory page.

2. The apparatus as recited in claim 1, wherein the misaligned memory operand is either retrieved from a memory or stored to said memory.

3. The apparatus as recited in claim 1, wherein the misaligned memory operand is accessed over a 64-bit data bus and wherein said address of the misaligned memory operand does not lie on an 8-byte boundary.

4. The apparatus as recited in claim 3, wherein two accesses are required to access the misaligned memory operand: a first access to a first quadword that contains a first part of the misaligned memory operand and a second access to a second quadword that contains a second part of the misaligned memory operand.

5. The apparatus as recited in claim 1, wherein a first part and a second part of the misaligned memory operand are both within said single memory page.

6. The apparatus as recited in claim 5, wherein said page boundary evaluation logic evaluates selected bits within said address to determine that said first and second parts lie within said single memory page.

7. The apparatus as recited in claim 6, wherein said single memory page comprises a 4 kB page and wherein said selected bits comprise bits 11:3 of said address.

8. The apparatus as recited in claim 6, wherein said page boundary evaluation logic comprises a comparator and wherein said comparator determines whether or not all of said selected bits are set.

9. The apparatus as recited in claim 8, wherein, if said comparator determines that said all of said selected bits are set, then a corresponding operand spans two memory pages and said address logic must issue a corresponding access tickle instruction for execution prior to accessing a corresponding first part and a corresponding second part of said corresponding operand, said corresponding first part being within a first one of said two memory pages and said corresponding second part being within a second one of said two memory pages.

10. The apparatus as recited in claim 1, wherein said access tickle instruction directs the microprocessor to determine if protection data corresponding to a memory page containing part of the misaligned memory operand would prohibit access to the misaligned memory operand, without directing that said part be accessed by the microprocessor.

11. A microprocessor apparatus for accessing a misaligned memory operand, the microprocessor apparatus comprising:
  address logic, for generating access instructions to access the misaligned memory operand, said access instructions comprising:
    an access tickle instruction, only directing page access validation of a second part of the misaligned memory operand;
    a first access instruction, directing page access validation of and access to a first part of the misaligned memory operand; and
    a second access instruction, directing page access validation of and access to said second part of the misaligned memory operand; and
  page limit logic, coupled to said address logic, for determining, prior to generation of said access tickle instruction, whether or not the misaligned memory operand spans two memory pages, wherein, if the misaligned memory operand resides within a single memory page, said page limit logic directs said address logic to preclude generation of said access tickle instruction.

12. The microprocessor apparatus as recited in claim 11, wherein the misaligned memory operand is accessed over a 64-bit data bus, and wherein an address corresponding to the misaligned memory operand does not lie on an 8-byte boundary.

13. The microprocessor apparatus as recited in claim 12, wherein two accesses are required to access the misaligned memory operand: a first access that is directed by said first access instruction to a first quadword that contains said first part, and a second access that is directed by said second access instruction to a second quadword that contains said second part.

14. The microprocessor apparatus as recited in claim 11, wherein said page limit logic evaluates selected bits of an address corresponding to the misaligned memory operand to determine if said first and second parts reside within said single memory page.

15. The microprocessor apparatus as recited in claim 14, wherein said single memory page comprises a 4 kB page and wherein said selected bits comprise bits 11:3 of said address.

16. The microprocessor apparatus as recited in claim 14, wherein said page limit logic comprises a comparator, and wherein said comparator determines whether or not all of said selected bits are set.

17. The microprocessor apparatus as recited in claim 14, wherein, if it is determined that said all of said selected bits are set, then the misaligned memory operand spans two memory pages and said page limit logic directs said address logic to allow generation of said access tickle instruction, wherein said access tickle instruction is executed prior to execution of said first access instruction.

18. The microprocessor apparatus as recited in claim 11, wherein said access tickle instruction directs the microprocessor to determine if protection data corresponding to a memory page containing said second part of the misaligned memory operand would prohibit access to the misaligned memory operand, without directing that said second part be accessed.

19. A data entity load/store apparatus in a microprocessor, the data entity load/store apparatus comprising:
  address stage logic, for providing instructions to load/store data entities to/from a memory, said address stage logic comprising;
    load/store instruction generation logic, for generating a specific instruction sequence to load/store a misaligned data entity; and
    a page boundary evaluator, coupled to said load/store instruction generation logic, for indicating conditions such that a tickle instruction is eliminated from within said specific instruction sequence; and
  data/ALU stage logic, coupled to said address stage logic, for executing said specific instruction sequence to load/store said misaligned data entity, wherein, if said tickle instruction is provided, then said data/ALU stage logic executes said tickle instruction by validating access to a first memory page without loading/storing a first portion of said misaligned data entity from/to said first memory page.

20. The data entity load/store apparatus as recited in claim 19, wherein said misaligned data entity is accessed over a 64-bit data bus, and wherein an address corresponding to said misaligned data entity lies on an address boundary other than an 8-byte boundary.

21. The data entity load/store apparatus as recited in claim 19, wherein, if said page boundary evaluator determines that said tickle instruction should not be provided, then said specific instruction sequence comprises:
  a first micro instruction, directing said data/ALU stage logic to validate access to said first memory page and to load/store said first portion of said misaligned data entity; and
  a second micro instruction, directing said data/ALU stage logic to validate access to said first memory page and to load/store a second portion of said specific misaligned data entity.

22. The data entity load/store apparatus as recited in claim 19, wherein, if said page boundary evaluator determines that said tickle instruction should be provided, then said specific instruction sequence comprises:
  said tickle instruction;
  a first micro instruction, directing said data/ALU stage logic to validate access to a second memory page and to load/store a second portion of said misaligned data entity; and
  a second micro instruction, directing said data/ALU stage logic to validate access to said first memory page and to load/store said first portion of said misaligned data entity.

23. The data entity load/store apparatus as recited in claim 19, wherein said page boundary evaluator checks selected bits of an address corresponding to the misaligned data entity to determine whether or not said first portion and a second portion of said misaligned data entity both reside within said first memory page.

24. The data entity load/store apparatus as recited in claim 23, wherein said first memory page comprises a 4 kB page and wherein said selected bits comprise bits 11:3 of said address.

25. The data entity load/store apparatus as recited in claim 24, wherein said page boundary evaluator comprises a comparator, and wherein said comparator determines whether or not all of said selected bits are set.

26. A method in a microprocessor for accessing a misaligned memory operand, the method comprising:
   a) evaluating an address corresponding to the misaligned memory operand to determine whether or not the misaligned memory operand is within a single memory page; and
   b) if the misaligned memory operand is within the single memory page, providing an instruction sequence to load a first part and a second part of the misaligned memory operand from the single memory page, wherein the instruction sequence does not perform a stand-alone tickle operation.

27. The method as recited in claim 26, wherein said evaluating comprises:
   i) determining if upper bits of a page offset field within the address are set;
   ii) if the upper bits are set, indicating that a first part of the misaligned memory operand resides within a first memory page and a second part of the misaligned memory operand resides within a second memory page; and
   iii) if the upper bits are not set, indicating that the first part and the second part of the misaligned memory operand reside within the single memory page.

28. The method as recited in claim 27, wherein said providing comprises:
   i) generating a first instruction that directs the microprocessor to validate access to the single memory page and to load the first part; and
   ii) generating a second instruction that directs the microprocessor to validate access to the single memory page and to load the second part.

29. The method as recited in claim 26, further comprising:
   c) if the misaligned memory operand is not within the single memory page, providing an instruction sequence to load a first part and a second part of the misaligned memory operand from the single memory page, wherein the instruction sequence performs a stand-alone tickle operation.

30. The method as recited in claim 29, wherein c) comprises:
   i) generating a tickle instruction that directs the microprocessor to validate access to a first memory page;
   ii) generating a first instruction that directs the microprocessor to validate access to a second memory page and to load the second part; and
   iii) generating a second instruction that directs the microprocessor to validate access to the first memory page and to load the first part.

* * * * *